US012700386B2

(12) United States Patent
Hirai et al.

(10) Patent No.: US 12,700,386 B2
(45) Date of Patent: Aug. 4, 2026

(54) SOUND BAR AND PERCUSSION INSTRUMENT

(71) Applicant: YAMAHA CORPORATION, Hamamatsu (JP)

(72) Inventors: Eri Hirai, Hamamatsu (JP); Kazuki Soga, Hamamatsu (JP); Hisaaki Mukai, Hamamatsu (JP); Junnosuke Kaseda, Hamamatsu (JP); Ichiro Osuga, Hamamatsu (JP); Yuichi Tadano, Hamamatsu (JP); Ayumi Irisa, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 275 days.

(21) Appl. No.: 18/487,431

(22) Filed: Oct. 16, 2023

(65) Prior Publication Data

US 2024/0038204 A1 Feb. 1, 2024

Related U.S. Application Data

(63) Continuation of application No. PCT/JP2022/013726, filed on Mar. 23, 2022.

(30) Foreign Application Priority Data

Apr. 20, 2021 (JP) ................................. 2021-071230

(51) Int. Cl.
*G10D 13/08* (2020.01)
*G10D 13/24* (2020.01)

(52) U.S. Cl.
CPC ............. *G10D 13/08* (2013.01); *G10D 13/24* (2020.02)

(58) Field of Classification Search
CPC ........ G10D 13/08; G10D 13/24; G10D 13/02; G10D 13/10; G10D 13/26; G10D 13/00
See application file for complete search history.

(56) References Cited

U.S. PATENT DOCUMENTS

| | | | | |
|---|---|---|---|---|
| 4,411,187 | A | 10/1983 | Roper et al. | |
| 11,495,197 | B2 * | 11/2022 | Jacobs | G10D 13/09 |

(Continued)

FOREIGN PATENT DOCUMENTS

| | | | |
|---|---|---|---|
| EP | 3316250 | A1 | 5/2018 |
| JP | S51122179 | U | 10/1976 |

(Continued)

OTHER PUBLICATIONS

English translation of Written Opinion issued in Intl. Appln. No. PCT/JP2022/013726, mailed Jun. 21, 2022, previously cited in IDS filed Oct. 16, 2023.

(Continued)

*Primary Examiner* — Kimberly R Lockett
(74) *Attorney, Agent, or Firm* — ROSSI, KIMMS & McDOWELL LLP

(57) ABSTRACT

A sound bar has a striking surface. The sound bar includes: a surface layer having a first surface constituting at least a part of the striking surface and a second surface opposite across a thickness of the surface layer from the first surface; and a base fixed to the second surface of the surface layer. A cutout surface is provided on a peripheral edge portion of the striking surface. The first surface of the surface layer is smaller than the base in a plan view.

16 Claims, 5 Drawing Sheets

(56) References Cited

U.S. PATENT DOCUMENTS

| | | | |
|---|---|---|---|
| 2003/0167899 | A1 | 9/2003 | Abe et al. |
| 2018/0122343 | A1 | 5/2018 | Hirai et al. |

FOREIGN PATENT DOCUMENTS

| | | | |
|---|---|---|---|
| JP | S53164819 | U | 12/1978 |
| JP | S59010994 | A | 1/1984 |
| JP | 2003084759 | A | 3/2003 |
| JP | 6614098 | B2 | 12/2019 |

OTHER PUBLICATIONS

International Search Report issued in Intl. Appln. No. PCT/JP2022/013726, mailed Jun. 21, 2022. provided.
Written Opinion issued in Intl. Appln. No. PCT/JP2022/013726, mailed Jun. 21, 2022.
Office Action issued in Japanese Appln. No. 2023-516362 mailed Nov. 5, 2024. English translation provided.
Office Action issued in Chinese Appln. No. 202280029684.0 mailed May 26, 2026.

* cited by examiner

SOUND BAR AND PERCUSSION INSTRUMENT

CROSS-REFERENCE TO RELATED APPLICATIONS

This is a continuation of International Application No. PCT/JP2022/013726 filed on Mar. 23, 2022, and claims priority from Japanese Patent Application No. 2021-071230 filed on Apr. 20, 2021, the entire content of which is incorporated herein by reference.

TECHNICAL FIELD

The present disclosure relates to a sound bar and a percussion instrument.

BACKGROUND ART

A percussion instrument, such as a marimba or a xylophone, includes a plurality of sound bars as sounding bodies. The sound bars emit sounds when struck by a mallet. The sound bars are made of wood that is cut out from natural wood such as rosewood, paddock, or Chinese quince (see JP6614098B2).

SUMMARY

JP6614098B2 describes that a plurality of fine holes are formed in a region that serves as a striking surface and the fine holes are impregnated with a resin so as to improve acoustic characteristics while preventing variations in quality due to individual differences in natural woods and unevenness in partial structures within an individual. As described above, a sound bar in the related art is designed to homogenize the sound.

In response to this, the present inventors have made intensive studies in order to obtain new findings of diversifying sounds during performance and expanding a range of the performance representation.

The present disclosure has been made in view of such circumstances, and an object thereof is to expand the range of the performance expression.

A sound bar according to an aspect of the present disclosure has a striking surface, and the sound bar includes: a surface layer having a first surface constituting at least a part of the striking surface and a second surface opposite across a thickness of the surface layer from the first surface; and a base provided on a second surface side, in which: a cutout surface is provided on a peripheral edge portion of the striking surface; and the first surface of the surface layer is smaller than the base in a plan view.

The base has a striking portion that is uncovered by the surface layer in the plan view.

The base has an upper surface, the surface layer is provided on the base such that the second surface of the surface layer faces the upper surface of the base, and the cutout surface includes a portion of the upper surface of the base, the portion of the upper surface being uncovered by the surface layer.

The surface layer has a third surface between the first surface and the second surface, and the cutout surface includes the third surface of the surface layer and an exposed surface of the base, the exposed surface being uncovered by the surface layer.

The cutout surface has a curved surface, and cross sections of the third surface of the surface layer and the exposed surface of the base, taken perpendicular to the first surface of the surface layer, are arcuate.

Cross sections of the third surface of the surface layer and the exposed surface of the base, taken perpendicular to the first surface of the surface layer, are polygonal.

The cutout surface includes the striking portion.

The base is made of wood.

The sound bar further includes an intermediate layer provided between the surface layer and the base such that the base is fixed to the intermediate layer, and the intermediate layer is fixed to the second surface of the surface layer.

Each of the surface layer and the intermediate layer contains oriented fibers, and a fiber direction of the oriented fibers of the intermediate layer is perpendicular to a fiber direction of the oriented fibers of the surface layer in the plan view.

The base includes a fourth surface and a fifth surface opposite across a thickness of the base from the fourth surface, the fifth surface of the base faces the surface layer, and the first surface of the surface layer is smaller than the fifth surface of the base in the plan view.

The base includes a plurality of laminated plates, and a lamination direction of the plurality of laminated plates is perpendicular to a thickness direction of the base.

The base contains oriented fibers, and a direction of the oriented fibers is substantially parallel to a normal direction of the striking surface.

A specific gravity of the surface layer is different from a specific gravity of the base.

A percussion instrument according to another aspect of the present disclosure includes a plurality of sound bars, each of the plurality of sound bars including: a surface layer having a first surface constituting at least a part of the striking surface and a second surface opposite across a thickness of the surface layer from the first surface; and a base fixed to the second surface of the surface layer, in which: a cutout surface is provided on a peripheral edge portion of the striking surface; and the first surface of the surface layer is smaller than the base in a plan view. The striking surface of each of the plurality of sound bars is elongated, and the surface layers of all of the plurality of sound bars are made of the same material as each other.

A percussion instrument according to yet another aspect of the present disclosure includes a plurality of sound bars, each of the plurality of sound bars including: a surface layer having a first surface constituting at least a part of the striking surface and a second surface opposite across a thickness of the surface layer from the first surface; and a base fixed to the second surface of the surface layer, in which: a cutout surface is provided on a peripheral edge portion of the striking surface; and the first surface of the surface layer is smaller than the base in a plan view. At least two or more sound bars of the plurality of sound bars differ in a number of layers or materials for corresponding layers from each other.

In the present disclosure, the sentence, "a direction of a fiber in an intermediate layer is perpendicular to a direction of a fiber in a surface layer in plan view", means that the direction along the fiber in the intermediate layer (for example, in a case where the intermediate layer includes wood, a direction along the pith of the wood) and the direction along the fiber in the surface layer are substantially perpendicular to each other in the plan view, and is not limited to a structure in which the direction of the fiber in the intermediate layer and the direction of the fiber in the surface layer are strictly perpendicular to each other. Further, the sentence, "a direction of a fiber is substantially parallel to the normal direction of the striking surface" means that the direction along the fiber (for example, the direction along the pith of the wood) is along the normal direction of the striking surface.

In a sound bar according to one aspect of the present disclosure, a base protrudes outward from a second surface of a surface layer in a plan view. This protruding portion can be used, for example, as a striking portion for rim shots. Since a striking surface and the striking portion of the sound bar are formed in separate layers, sound quality of the striking surface and the striking portion can be varied. Accordingly, the sound bar can diversify sounds during performance and expand a range of the performance representation.

BRIEF DESCRIPTION OF DRAWINGS

The present disclosure will be described in detail based on the following figures, wherein.

DESCRIPTION OF EMBODIMENTS

Hereinafter, embodiments of the present disclosure will be described in detail with reference to the drawings as appropriate.

First Embodiment

<Sound Bar>

Figure 1:
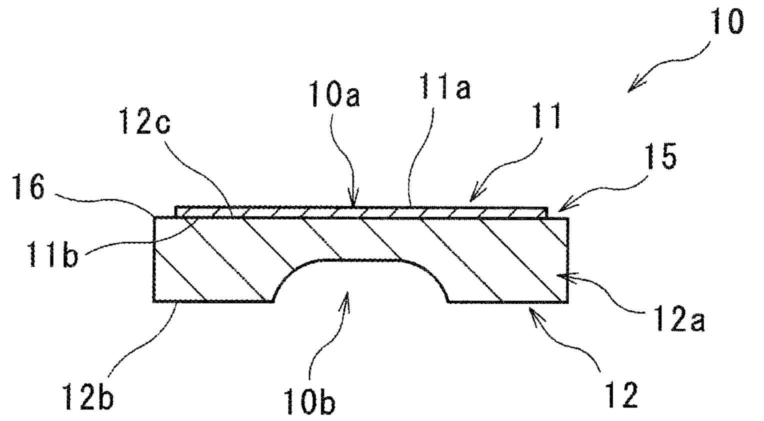
FIG. 1 is a schematic sectional view taken along a plane parallel to a side surface of a sound bar according to an embodiment of the present disclosure.
Figure 2:
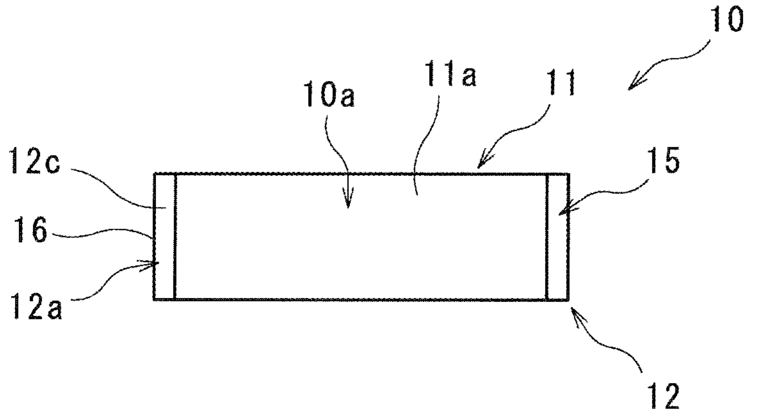
FIG. 2 is a schematic plan view of the sound bar of FIG. 1.

A sound bar 10 of FIGS. 1 and 2 has a striking surface 10*a*. The sound bar 10 includes: a surface layer 11 having a first surface 11*a* constituting at least a part of a striking surface 10*a* and a second surface 11*b* on a side opposite to the first surface 11*a*; and a base 12 provided on a second surface 11*b* side of the surface layer 11. A cutout surface 15 is provided in a peripheral edge portion of the striking surface 10*a*. The second surface 11*b* of the surface layer 11 is located within the cutout surface 15. That is, the cutout surface 15 extends to the side opposite to the first surface 11*a* with the second surface 11*b* of the surface layer 11 as a reference. The "cutout surface" means a surface formed by cutting out a corner portion in a thickness direction. The corner portion is located at a peripheral edge of the striking surface when the sound bar is viewed from a direction perpendicular to the thickness direction. The "cutout surface" may be a flat surface or a curved surface. In addition, the "cutout surface" may include two or more flat surfaces, and may include both flat surfaces and curved surfaces (in FIG. 1, a shape including two flat surfaces, that is, a flat surface perpendicular to the thickness direction and a flat surface parallel to the thickness direction). As shown in FIG. 2, in a plan view, the first surface 11*a* of the surface layer 11 is smaller than the base 12, and the cutout surface 15 is provided on the peripheral edge portion of the striking surface 10*a*.

The sound bar 10 has a striking portion 16 that protrudes outward from the second surface 11*b* in the plan view on the side opposite to the first surface 11*a* with the second surface 11*b* of the surface layer 11 as a reference. The striking portion 16 includes layers other than the surface layer 11. The base 12 has an upper surface (corresponding to a second surface 12*c* described later). The surface layer 11 is provided on the base 12 so that the second surface 11*b* of the surface layer 11 faces the upper surface of the base 12. The cutout surface 15 includes a portion of the upper surface of the base 12, the portion being exposed to the outside.

Figure 3:
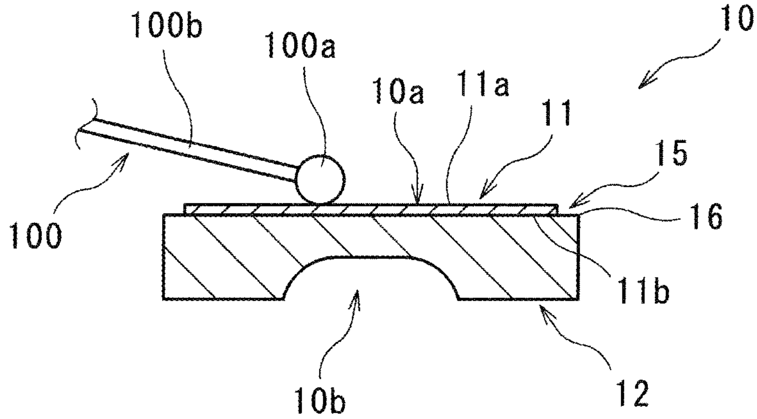
FIG. 3 is a schematic diagram showing a first use state of the sound bar of FIG. 1.
Figure 4:
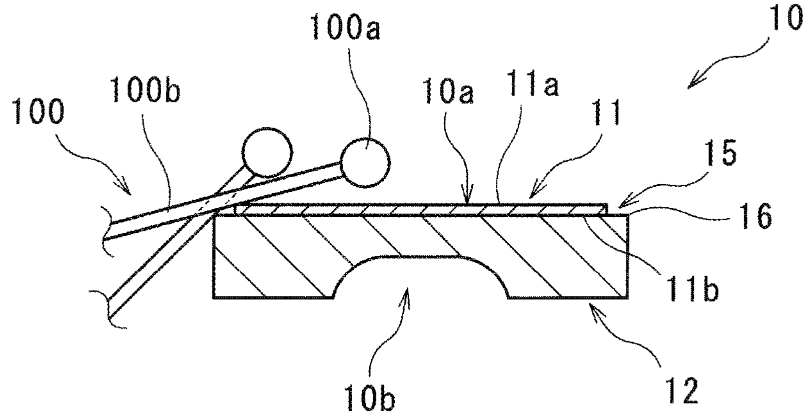
FIG. 4 is a schematic diagram showing a second use state of the sound bar of FIG. 1.

The sound bar 10 is used for percussion instruments such as a marimba, a xylophone, and a vibraphone. The sound bar 10 has the striking surface 10*a* to be struck with a mallet, and is provided with a recessed portion 10*b* on a surface on a side opposite to the striking surface 10*a*. As shown in FIG. 3, the striking surface 10*a* is a flat surface, and emits a first sound when struck by a head 100*a* of a mallet 100. As shown in FIG. 4, an edge portion of the striking surface 10*a* can emit a second sound when struck by a handle 100*b* of the mallet 100. Further, as shown in FIG. 4, the sound bar 10 is formed with the striking portion 16 in a layer other than the surface layer 11. The striking portion 16 can emit a third sound when struck by the handle 100*b* of the mallet 100. As described above, the sound bar 10 has the striking portion 16 in the layer other than the surface layer 11, so that the sound quality can be varied.

Hereinafter, a specific configuration of the sound bar 10 will be described.

In the sound bar 10, the surface layer 11 and the base 12 are directly laminated. The sound bar 10 of FIG. 1 does not include a layer other than the surface layer 11 and the base 12. Alternatively, the sound bar 10 may include a layer other than the surface layer 11 and the base 12. The surface layer 11 and the base 12 are fixed using, for example, an adhesive. The surface layer 11, the base 12, and the like may be subjected to surface treatment by coating or the like. However, a coating film provided by the surface treatment or the adhesive alone does not constitute a "layer" or a "base" in the present disclosure.

(Surface Layer)

The surface layer 11 has a thin plate shape. The first surface 11*a* of the surface layer 11 constitutes an uppermost surface of the sound bar 10 to be struck with a mallet. The first surface 11*a* is elongated, and more specifically, is rectangular in the plan view.

A material for the surface layer 11 is not particularly limited, and examples thereof include wood, resin, fiber reinforced resin (FRP), paper, metal, ceramic, elastomer, etc. The material can be selected based on sound quality or the like required for the sound bar 10. As the material, for example, a material containing oriented fibers is used. Examples of the material containing oriented fibers include wood, fiber reinforced resin, paper, etc. If the sound bar 10 is intended to emit a wooden sound, the material is wood. In addition, a material obtained by impregnating a porous base material such as wood with a dissimilar material may be used as the material. Since the surface layer 11 is impregnated with the dissimilar material, strength of the surface layer 11 can be increased.

Examples of the wood include rosewood, paddock, Chinese quince, maple, hard maple, hornbeam, beech, oak, matoa, mahogany, birch, etc.

As the dissimilar material, for example, a material having a specific gravity higher than that of the base material is used. Examples of the dissimilar material include a resin. The resin is not particularly limited, and a thermosetting resin, which has a low viscosity and with which the base material is easily impregnated, may be used. Examples of thermosetting resin include epoxy resins, phenol resins, urea resins, polyesters, acrylic resins, silicate resins, melamine resins, polyurethanes, etc.

The dissimilar material may contain a filler (fine particles). Examples of the filler include talc, glass fiber, etc. When the filler is contained in the dissimilar material, the strength of the surface layer 11 can be further increased.

With the dissimilar material, for example, an entire region of the surface layer 11 is impregnated. By impregnating the entire region of the surface layer 11 with the dissimilar material, the uniformity of sound quality in the entire surface layer 11 can be achieved.

A lower limit of a thickness of the surface layer 11 is preferably 0.1 mm, more preferably 0.5 mm, and still more preferably 1.5 mm, if the sound bar 10 is used for a marimba, for example. On the other hand, an upper limit of the thickness of the surface layer 11 is preferably 10 mm, more preferably 5.0 mm, and still more preferably 2.5 mm, if the sound bar 10 is used for a marimba, for example. When the thickness is less than the lower limit, the effect obtained by providing the surface layer 11 may be insufficient. Conversely, when the thickness exceeds the upper limit, it may be difficult to uniformly impregnate the surface layer 11 with the dissimilar material.

(Base)

The base 12 supports the surface layer 11 from a lower surface side thereof. The base 12 includes a lowermost layer located on a lowermost surface on a side opposite to the first surface 11*a* of the surface layer 11 in the sound bar 10. As shown in FIG. 1, the base 12 may have only a single layer in a thickness direction thereof. In this case, the base 12 as a whole constitutes a lowermost layer 12*a*. On the other hand, the base 12 may be, for example, a laminated body in which a plurality of plate materials are stacked in the thickness direction thereof. The plurality of plate materials can be fixed by, for example, an adhesive. In this case, a layer positioned on the lowermost surface of the laminated body constitutes the lowermost layer.

The lowermost layer 12*a* has a first surface 12*b* (an example of a fourth surface) constituting at least a part of the lowest surface and a second surface 12*c* (an example of a fifth surface) on a side opposite to the first surface 12*b*. The recessed portion 10*b* is provided on the first surface 12*b*.

The second surface 12*c* of the lowermost layer 12*a* is located within the cutout surface 15. More specifically, the second surface 12*c* of the lowermost layer 12*a* constitutes a part of the cutout surface 15. Since the second surface 11*b* of the surface layer 11 is located within the cutout surface 15, a part of another layer (the base 12 in the present embodiment) laminated on the surface layer 11 is disposed on the cutout surface 15 in the sound bar 10. The portion disposed on the cutout surface 15 functions as the striking portion 16 to be struck with the handle 100*b* of the mallet 100. Since the second surface 12*c* of the lowermost layer 12*a* is located within the cutout surface 15, it is possible to easily allow the lowermost layer 12*a* to emit a sound with sound quality different from that of the surface layer 11 in the sound bar 10.

Figure 5:
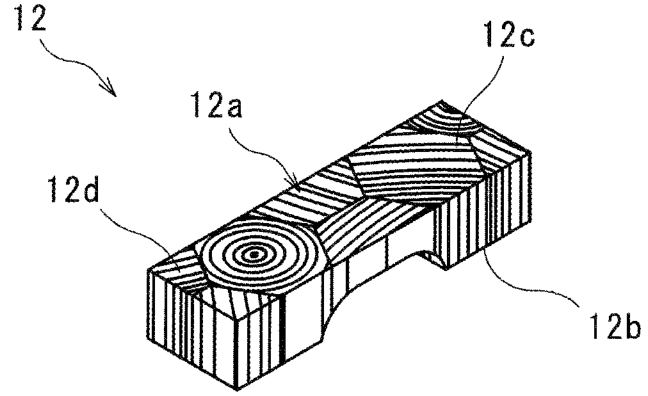
FIG. 5 is a schematic perspective view showing an example of a base of the sound bar of FIG. 1.

As shown in FIG. 5, the base 12 may be a laminated body in which a plurality of plate materials 12*d* are laminated in a plane direction perpendicular to the thickness direction of the base 12. That is, the base 12 is a laminated body in which the plurality of plate materials 12*d* are laminated, and a lamination direction of the plate materials 12*d* and the thickness direction of the base 12 may be perpendicular to each other. The plurality of plate materials 12*d* can be fixed by, for example, an adhesive. In FIG. 5, the laminated body in which the plurality of plate materials 12*d* are laminated in the plane direction constitutes the lowermost layer 12*a*. According to this configuration, an adhesive for bonding the plurality of plate materials 12*d* is not applied in a film manner in the plane direction. As a result, it is possible to prevent attenuation of vibration in the plane direction caused by the adhesive, and to easily emit a sound with extension. The second surface 12*c* of the laminated body is located within the cutout surface 15 in the sound bar 10. Therefore, the sound quality of the striking portion 16 can be adjusted by, for example, selecting a type of the plate material 12*d* used in the laminated body. In addition, by arranging the plurality of types of plate materials 12*d* in the cutout surface 15, the sound quality of the striking portion 16 can be easily varied. As a result, a range of a performance expression can be further expanded.

A material for the base 12 is not particularly limited, and examples thereof include the materials exemplified for the surface layer 11.

The base 12 contains, for example, oriented fibers. Examples of the material containing oriented fibers include wood, fiber reinforced resin, paper, etc. When the base 12 contains oriented fibers, a direction of the fibers is preferably substantially parallel to the normal direction of the striking surface 10*a*. According to this configuration, a horizontal component of an adhesive layer surface between the layers is reduced, so that the influence of a damping action due to the viscoelasticity is reduced. That is, the sound quality can be maintained. In the sound bar 10, for example, by using a material including oriented fibers as the plate material 12*d* and laminating the plurality of plate materials 12*d* in the plane direction as shown in FIG. 5, the direction of the fibers is easily arranged substantially parallel to the normal direction of the striking surface 10*a* in the sound bar 10.

For example, specific gravities of two or more layers (the surface layer 11 and the base 12 in the present embodiment) located within the cutout surface 15 are different. According to this configuration, the surface layer 11 and the striking portion 16 are likely to emit sounds having different sound qualities. Further, by making the specific gravity of the surface layer 11 larger than the specific gravity of the base 12, it is possible to increase the variety of performance while enhancing durability.

For example, materials for two or more layers (the surface layer 11 and the base 12 in the present embodiment) located within the cutout surface 15 are different. According to this configuration, the surface layer 11 and the striking portion 16 are likely to emit sounds having different sound qualities. The sentence, "the materials are different", includes a difference in a type of a material that is a main component of the layer, and a difference in presence or absence of impregnation of the dissimilar material. The phrase, "difference in a type of a material", includes, for example, a difference in the type of wood or resin.

The base 12 is made of wood, for example. The base 12 may be made of a single piece of wood or a plurality pieces of wood. Since the base 12 of the sound bar 10 is made of wood, it is easy to emit a wooden sound. The base 12 may be impregnated with the above-described dissimilar material. In a case where the base 12 is made of a plurality pieces of wood, only some of the wood may be impregnated with the dissimilar material. When both the surface layer 11 and the base 12 contain wood, for example, the type of the wood used for the surface layer 11 and the type of the wood used for the base 12 may be different from each other from a viewpoint of making the specific gravity of the surface layer 11 different from the specific gravity of the base 12. From the viewpoint of making the specific gravity of the surface layer 11 different from the specific gravity of the base 12, for example, only one of the surface layer 11 and the base 12 may be impregnated with the dissimilar material.

(Cutout Surface)

As shown in FIGS. 1 and 2, the cutout surface 15 is provided along each of both end edges of the striking surface 10*a* in a longitudinal direction. The surface layer 11 has a third surface (an end surface of the surface layer 11) between the first surface 11*a* and the second surface 11*b*. The cutout surface includes the third surface (end surface) of the surface layer 11 and an exposed surface (second surface 12*c*) of the base 12 exposed to the outside. In the present embodiment, the exposed surface (second surface 12*c*) is continuous with the third surface (end surface) of the surface layer 11. In the present embodiment, the cutout surface 15 includes the end surface of the surface layer 11 and the second surface 12*c* of the base 12.

The cutout surface 15 is provided with the striking portion 16 for rim shots. The striking portion 16 is provided in a layer different from the surface layer 11, and is provided on the base 12 in the present embodiment. The striking portion 16 extends along the longitudinal direction of the cutout surface 15. The striking portion 16 constitutes a ridge portion extending in the longitudinal direction of the cutout surface 15.

<Advantages>

In the sound bar 10, the base 12 protrudes outward from the second surface 11*b* of the surface layer 11 in plan view. This protruding portion can be used, for example, as the striking portion 16 for rim shots. Since the striking surface 10*a* and the striking portion 16 of the sound bar 10 are formed in separate layers, the sound quality of the striking surface 10*a* and the striking portion 16 can be varied. Accordingly, the sound bar 10 can diversify sounds during performance and expand a range of the performance representation.

Since the second surface 11*b* of the surface layer 11 is located within the cutout surface 15, the striking surface 10*a* and the striking portion 16 can be formed in separate layers in the sound bar 10. Accordingly, the sound bar 10 can diversify sounds during performance and expand a range of the performance representation.

Second Embodiment

<Sound Bar>

Figure 6:
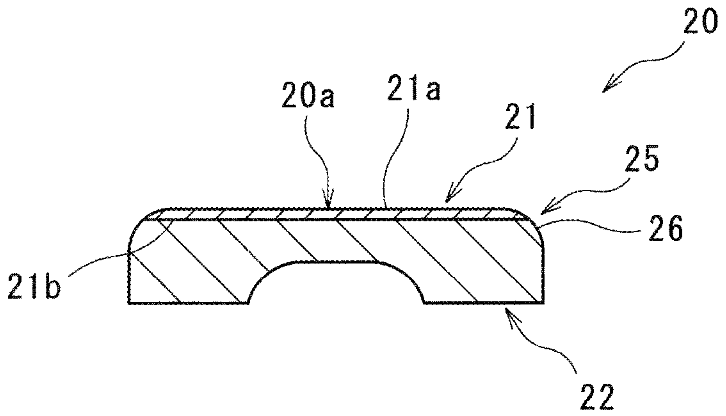
FIG. 6 is a schematic sectional view taken along a plane parallel to a side surface of a sound bar according to an embodiment different from the sound bar of FIG. 1.

A sound bar 20 of FIG. 6 has a striking surface 20*a*. The sound bar 20 includes: a surface layer 21 having a first surface 21*a* constituting at least a part of a striking surface 20*a* and a second surface 21*b* on a side opposite to the first surface 21*a*; and a base 22 provided on a second surface 21*b* side of the surface layer 21. A cutout surface 25 is provided in a peripheral edge portion of the striking surface 20*a*. The second surface 21*b* of the surface layer 21 is located within the cutout surface 25. The sound bar 20 is provided with a striking portion 26 that protrudes outward from the second surface 21*b* in the plan view on the side opposite to the first surface 21*a* with the second surface 21*b* as a reference. The sound bar 20 in FIG. 6 has a configuration in which the first surface 21*a* of the surface layer 21 is smaller than the base 22 in the plan view, and is provided with the cutout surface 25 on the peripheral edge portion of the striking surface 20*a*.

The sound bar 20 can have the same configuration as the sound bar 10 of FIGS. 1 to 5 except for a shape of the cutout surface 25. Therefore, only the cutout surface 25 will be described below.

<Cutout Surface>

The cutout surface 25 is provided along each of both end edges of the striking surface 20*a* in a longitudinal direction. In the present embodiment, the cutout surface 25 includes an end surface of the surface layer 21 and an end surface of the base 12 continuous with the end surface. The surface layer 21 has a third surface (end surface) between the first surface 21*a* and the second surface 21*b*. The cutout surface 25 includes the third surface of the surface layer 21 (the end surface of the surface layer 21) and an exposed surface of the base 22 (an end surface of the base 22) exposed to the outside. In the present embodiment, the exposed surface of the base (the end surface of the base 22) is continuous with the third surface (end surface) of the surface layer 11.

The cutout surface 25 is a curved surface. A cross section perpendicular to an extending direction of the cutout surface 25 is arcuate. That is, cross sections of the third surface of the surface layer 21 (the end surface of the surface layer 21) and the exposed surface of the base 22 (the end surface of the base 22), the cross sections being perpendicular to the first surface 21*a* of the surface layer 21, are arcuate.

The cutout surface 25 is provided with the striking portion 26 for rim shots. The striking portion 26 is provided in a layer different from the surface layer 21, and is provided on the base 22 in the present embodiment. The striking portion 26 extends along the longitudinal direction of the cutout surface 25. The striking portion 26 may constitute a ridge portion extending in the longitudinal direction of the cutout surface 25. That is, the cutout surface 25 may be configured to have a smaller radius of curvature in a region corresponding to the striking portion 26.

<Advantages>

Since the striking surface 20*a* and the striking portion 26 of the sound bar 20 are formed in separate layers, the sound quality of the striking surface 20*a* and the striking portion 26 can be varied. Accordingly, similar to the sound bar 10 shown in FIGS. 1 to 5, the sound bar 20 can diversify sounds during performance and expand a range of the performance representation.

Third Embodiment

<Sound Bar>

Figure 7:
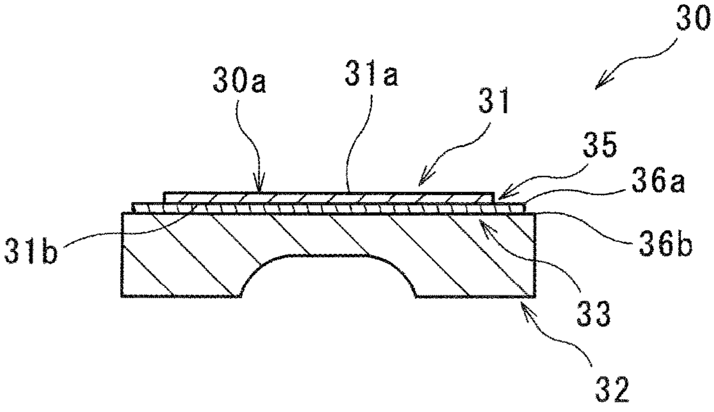
FIG. 7 is a schematic sectional view taken along a plane parallel to a side surface of a sound bar according to an embodiment different from the sound bar of FIGS. 1 and 6.
Figure 8:
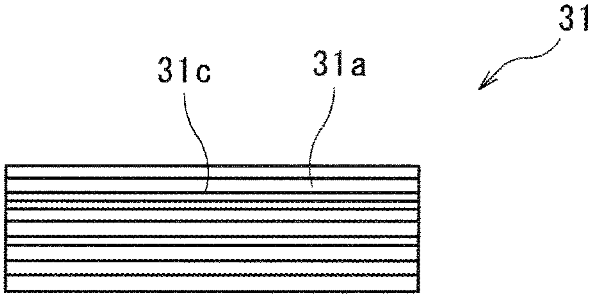
FIG. 8 is a schematic view showing a first surface of a surface layer of the sound bar of FIG. 7.
Figure 9:
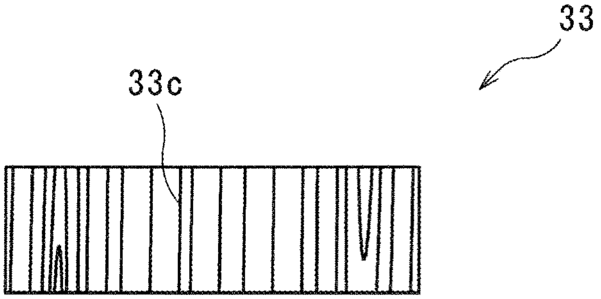
FIG. 9 is a schematic view showing a surface on a surface layer side of an intermediate layer of the sound bar of FIG. 7.

A sound bar 30 of FIGS. 7 to 9 has a striking surface 30*a*. The sound bar 30 includes: a surface layer 31 having a first surface 31*a* constituting at least a part of a striking surface 30*a* and a second surface 31*b* on a side opposite to the first surface 31*a*; and a base 32 provided on a second surface 31*b* side of the surface layer 31. The sound bar 30 further includes an intermediate layer 33 provided between the surface layer 31 and the base 32. A cutout surface 35 is provided in a peripheral edge portion of the striking surface 30*a*. The second surface 31*b* of the surface layer 31 is located within the cutout surface 35. The sound bar 30 is provided with a striking portion (a first striking portion 36*a* and a second striking portion 36*b*) that protrudes outward from the second surface 31*b* in the plan view on the side opposite to the first surface 31*a* with the second surface 31*b* as a reference. The sound bar 30 in FIG. 7 has a configuration in which the first surface 31*a* of the surface layer 31 is smaller than the base 32 in the plan view, and is provided with the cutout surface 35 on the peripheral edge portion of the striking surface 30*a*. Further, the sound bar 30 in FIG. 7 has a configuration in which the first surface 31*a* of the surface layer 31 is smaller than the intermediate layer 33 in the plan view, and is provided with the cutout surface 35 including the striking portion 36*a* on the peripheral edge portion of the striking surface 30*a*. Further, the sound bar 30 in FIG. 7 has a configuration in which the intermediate layer 33 is smaller than the base 32 in the plan view, and is provided with the cutout surface 35 including the striking portion 36*b* on the peripheral edge portion of the striking surface 30*a*.

The surface layer 31, the intermediate layer 33, and the base 32 are fixed using, for example, an adhesive. The surface layer 31, the intermediate layer 33, and the base 32 are disposed in this order from the striking surface 30*a* toward the lower surface side. The sound bar 30 of FIG. 7 does not include a layer other than the surface layer 31, the intermediate layer 33, and the base 32. Alternatively, the sound bar 30 may include a layer other than the surface layer 31, the intermediate layer 33, and the base 32. The base 32 has an upper surface (a surface including the striking portion 36*b* described later). The surface layer 31 is provided on the base 32 via the intermediate layer 33 so that the second surface 31*b* of the surface layer 31 faces the upper surface of the base 32. The cutout surface 35 includes a portion of the upper surface of the base 32 that is exposed to the outside.

(Surface Layer)

The surface layer 31 contains oriented fibers. Examples of the material containing oriented fibers include wood, fiber reinforced resin, paper, etc. For example, the surface layer 31 contains wood as the material. The surface layer 31 may be impregnated with the above-described dissimilar material. A thickness of the surface layer 31 can be the same as that of the surface layer 11 of the sound bar 10 of FIG. 1.

As shown in FIG. 8, for example, fibers 31*c* of the surface layer 31 extend along the longitudinal direction of the first surface 31*a*. According to this configuration, it is possible to improve an appearance of the sound bar 30.

(Base)

The base 32 supports the surface layer 31 and the intermediate layer 33 from the lower surface side thereof. A specific configuration of the base 32 is not particularly limited, and may be the same as the base 12 of the sound bar 10 in FIG. 1.

(Intermediate Layer)

The intermediate layer 33 contains oriented fibers. Examples of the material containing oriented fibers include wood, fiber reinforced resin, paper, etc. For example, the intermediate layer 33 contains wood as the material.

As shown in FIGS. 8 and 9, for example, a direction of fibers 33*c* of the intermediate layer 33 is perpendicular to a direction of the fibers 31*c* of the surface layer 31 in the plan view. According to this configuration, it is possible to easily and reliably prevent cracking of the sound bar 30. In particular, by arranging the fibers 31*c* of the surface layer 31 along the longitudinal direction of the first surface 31*a* and making the direction of the fibers 33*c* of the intermediate layer 33 perpendicular to the direction of the fibers 31*c* of the surface layer 31 in the plan view, it becomes easier to make the direction of the fibers 33*c* of the intermediate layer 33 cross a crack propagation direction. Therefore, for example, even when wood having a relatively small specific gravity is used for the intermediate layer 33, it is easy to prevent cracking of the sound bar 30. As a result, a degree of freedom in the thickness of the intermediate layer 33 and a degree of freedom in selecting the type of wood are increased, which makes it easier to improve the sound quality of the sound bar 30.

A lower limit of the thickness of the intermediate layer 33 is preferably 0.1 mm, more preferably 0.3 mm, and still more preferably 0.5 mm, if the sound bar 30 is used for a marimba, for example. On the other hand, an upper limit of the thickness of the intermediate layer 33 is preferably 3 mm, more preferably 1.5 mm, and still more preferably 1.0 mm, if the sound bar 30 is used for a marimba, for example. When the thickness is less than the lower limit, it may be difficult to form the first striking portion 36*a* with the intermediate layer 33. Conversely, when the thickness exceeds the upper limit, the intermediate layer 33 may become unnecessarily thick.

The specific gravity of the surface layer 31 is, for example, different from the specific gravity of the intermediate layer 33. The material for the surface layer 31 and the material for the intermediate layer 33 are, for example, different. According to the configuration, the surface layer 31 and the intermediate layer 33 are likely to emit sounds having different sound qualities.

(Cutout Surface)

The cutout surface 35 is provided along each of both end edges of the striking surface 30*a* in the longitudinal direction. In the present embodiment, the cutout surface 35 is formed to extend over three layers of the surface layer 31, the intermediate layer 33, and the base 32. The surface layer 31 has a third surface (an end surface of the surface layer 31) between the first surface 31*a* and the second surface 31*b*. The cutout surface includes the third surface (end surface) of the surface layer 31 and an exposed surface (second surface 32*c*) of the base 32 exposed to the outside. In the present embodiment, the third surface (end surface) of the surface layer 31 is continuous with the exposed surface (second surface 32*c*) via a surface of the intermediate layer 33.

The cutout surface 35 is provided with the first striking portion 36*a* and the second striking portion 36*b* for rim shots. The first striking portion 36*a* is provided on the intermediate layer 33, and the second striking portion 36*b* is provided on the base 32. That is, in the sound bar 30, the striking surface 30*a*, the first striking portion 36*a*, and the second striking portion 36*b* are provided in different layers. Each of the first striking portion 36*a* and the second striking portion 36*b* extends along the longitudinal direction of the cutout surface 35. The first striking portion 36*a* and the second striking portion 36*b* form a ridge portion extending in the longitudinal direction of the cutout surface 35.

<Advantages>

In the sound bar 30, the intermediate layer 33 is provided between the surface layer 31 and the base 32, and at least a part of the intermediate layer 33 is included in the cutout surface 35, so that the intermediate layer 33 can be easily made to function as a layer for varying the sound quality. Further, in addition to the intermediate layer 33, the sound bar 30 is configured such that at least a part of the base 32 is included in the cutout surface 35, so that a sound based on the material for each of the three layers of the surface layer 31, the intermediate layer 33, and the base 32 can be emitted.

Fourth Embodiment

<Sound Bar>

Figure 10:
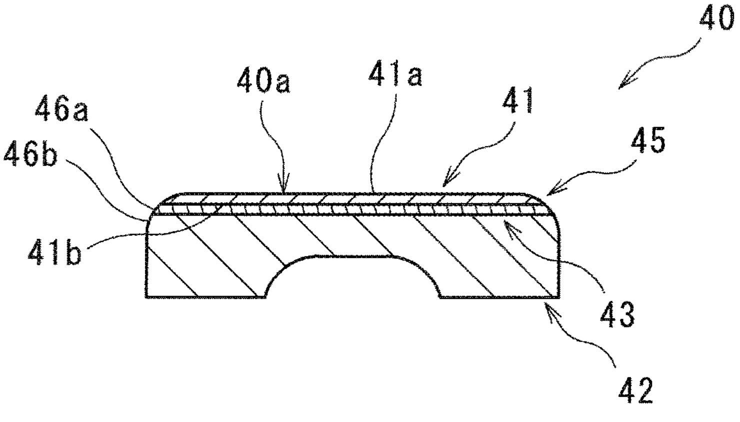
FIG. 10 is a schematic sectional view taken along a plane parallel to a side surface of a sound bar according to an embodiment different from the sound bar of FIGS. 1, 6, and 7.

A sound bar 40 of FIG. 10 has a striking surface 40*a*. The sound bar 40 includes: a surface layer 41 having a first surface 41*a* constituting at least a part of a striking surface 40*a* and a second surface 41*b* on a side opposite to the first surface 41*a*; and a base 42 provided on a second surface 41*b* side of the surface layer 41. The sound bar 40 further includes an intermediate layer 43 provided between the surface layer 41 and the base 42. A cutout surface 45 is provided in a peripheral edge portion of the striking surface 40*a*. The second surface 41*b* of the surface layer 41 is located within the cutout surface 45. The sound bar 40 is provided with a striking portion (a first striking portion 46*a* and a second striking portion 46*b*) that protrudes outward from the second surface 41*b* in the plan view on the side opposite to the first surface 41*a* with the second surface 41*b* as a reference. The sound bar 40 in FIG. 10 has a configuration in which the first surface 41*a* of the surface layer 41 is smaller than the base 42 in the plan view, and is provided with the cutout surface 45 on the peripheral edge portion of the striking surface 40*a*. Further, the sound bar 40 in FIG. 10 has a configuration in which the first surface 41*a* of the surface layer 41 is smaller than the intermediate layer 43 in the plan view, and is provided with the cutout surface 45 including the striking portion 46*a* on the peripheral edge portion of the striking surface 40*a*. Further, the sound bar 40 in FIG. 10 has a configuration in which the intermediate layer 43 is smaller than the base 42 in the plan view, and is provided with the cutout surface 45 including the striking portion 46*b* on the peripheral edge portion of the striking surface 40*a*.

The sound bar 40 can have the same configuration as the sound bar 30 of FIGS. 7 to 9 except for a shape of the cutout surface 45. Therefore, only the cutout surface 45 will be described below.

(Cutout Surface)

The cutout surface 45 is provided along each of both end edges of the striking surface 40*a* in the longitudinal direction. In the present embodiment, the cutout surface 45 includes the end surface of the surface layer 41, the end surface of the intermediate layer 43 continuous with the end surface of the surface layer 41, and the end surface of the base 12 continuous with the end surface of the intermediate layer 43. That is, the cutout surface 45 is formed over three layers of the surface layer 41, the intermediate layer 43, and the base 42. In other words, the surface layer 41 has a third surface (an end surface of the surface layer 41) between the first surface 41*a* and the second surface 41*b*. The cutout surface 45 includes the third surface (end surface) of the surface layer 41 and an exposed surface of the base 42 (an end surface of the base 42) exposed to the outside. In the present embodiment, the third surface (end surface) of the surface layer 41 is continuous with the exposed surface of the base 42 (the end surface of the base 42) via the end surface of the intermediate layer 43. The cutout surface 45 is a curved surface. A cross section perpendicular to an extending direction of the cutout surface 45 is arcuate. That is, cross sections of the third surface of the surface layer 41 (the end surface of the surface layer 41), the end surface of the intermediate layer 43, and the exposed surface of the base 42 (the end surface of the base 42), the cross sections being perpendicular to the first surface 41*a* of the surface layer 41, are arcuate.

The cutout surface 45 is provided with the first striking portion 46*a* and the second striking portion 46*b* for rim shots. The first striking portion 46*a* is provided on the intermediate layer 43, and the second striking portion 46*b* is provided on the base 42. That is, in the sound bar 40, the striking surface 40*a*, the first striking portion 46*a*, and the second striking portion 46*b* are provided in different layers. The first striking portion 46*a* and the second striking portion 46*b* extend along the longitudinal direction of the cutout surface 45. The first striking portion 46*a* and the second striking portion 46*b* may form a ridge portion extending in the longitudinal direction of the cutout surface 45.

<Advantages>

As in the case of the sound bar 30 of FIGS. 7 to 9, the intermediate layer 43 of the sound bar 40 can be easily made to function as a layer for varying the sound quality. Further, in addition to the intermediate layer 43, the sound bar 40 is configured such that at least a part of the base 42 is included in the cutout surface 45, so that a sound based on the material for each of the three layers of the surface layer 41, the intermediate layer 43, and the base 42 can be emitted.

Fifth Embodiment

<Sound Bar>

Figure 11:
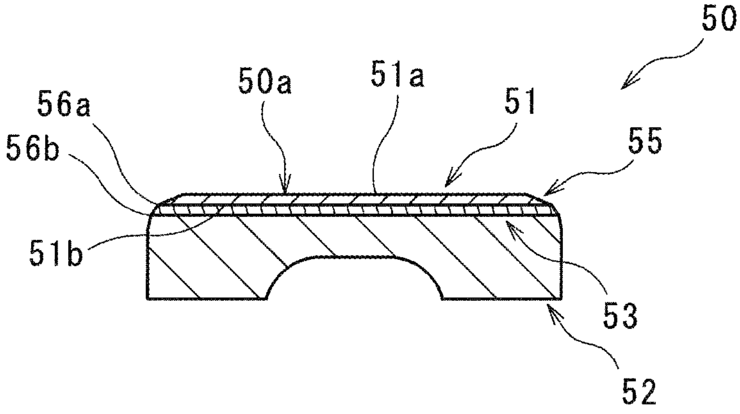
FIG. 11 is a schematic sectional view taken along a plane parallel to a side surface of a sound bar according to an embodiment different from the sound bar of FIGS. 1, 6, 7, and 10.

A sound bar 50 of FIG. 11 has a striking surface 50*a*. The sound bar 50 includes: a surface layer 51 having a first surface 51*a* constituting at least a part of a striking surface 50*a* and a second surface 51*b* on a side opposite to the first surface 51*a*; and a base 52 provided on a second surface 51*b* side of the surface layer 51. The sound bar 50 further includes an intermediate layer 53 provided between the surface layer 51 and the base 52. A cutout surface 55 is provided in a peripheral edge portion of the striking surface 50*a*. The second surface 51*b* of the surface layer 51 is located within the cutout surface 55. The sound bar 50 is provided with a striking portion (a first striking portion 56*a* and a second striking portion 56*b*) that protrudes outward from the second surface 51*b* in the plan view on the side opposite to the first surface 51*a* with the second surface 51*b* as a reference. The sound bar 50 in FIG. 11 has a configuration in which the first surface 51*a* of the surface layer 51 is smaller than the base 52 in the plan view, and is provided with the cutout surface 55 on the peripheral edge portion of the striking surface 50*a*. Further, the sound bar 50 in FIG. 11 has a configuration in which the first surface 51*a* of the surface layer 51 is smaller than the intermediate layer 53 in the plan view, and is provided with the cutout surface 55 including the striking portion 56*a* on the peripheral edge portion of the striking surface 50*a*. Further, the sound bar 50 in FIG. 11 has a configuration in which the intermediate layer 53 is smaller than the base 52 in the plan view, and is provided with the cutout surface 55 including the striking portion 56*b* on the peripheral edge portion of the striking surface 50*a*. The surface layer 51 has a third surface (an end surface of the surface layer 51) between the first surface 51*a* and the second surface 51*b*. For example, the cutout surface 55 includes the third surface (end surface) of the surface layer 51 and an exposed surface of the base 52 (an end surface of the base 52) exposed to the outside. In the present embodiment, the third surface (end surface) of the surface layer 51 is continuous with the exposed surface of the base 52 (the end surface of the base 52) via the end surface of the intermediate layer 53.

The cutout surface 55 is formed of a plurality of flat surfaces such that a cross section perpendicular to the extending direction thereof has a polygonal shape. Cross sections of the third surface of the surface layer 51 (the end surface of the surface layer 51) and the exposed surface of the base 52 (the end surface of the base 52), the cross sections being perpendicular to the first surface 51*a* of the surface layer 51, are polygonal. The sound bar 50 can have the same configuration as the sound bar 40 of FIG. 10 except for a shape of the cutout surface 55.

<Advantages>

As in the case of the sound bar 30 of FIGS. 7 to 9, the intermediate layer 53 of the sound bar 50 can be easily made to function as a layer for varying the sound quality. Further, in addition to the intermediate layer 53, the sound bar 50 is configured such that at least a part of the base 52 is included in the cutout surface 55, so that a sound based on the material for each of the three layers of the surface layer 51, the intermediate layer 53, and the base 52 can be emitted.

Sixth Embodiment

<Percussion Instrument>

Figure 12:
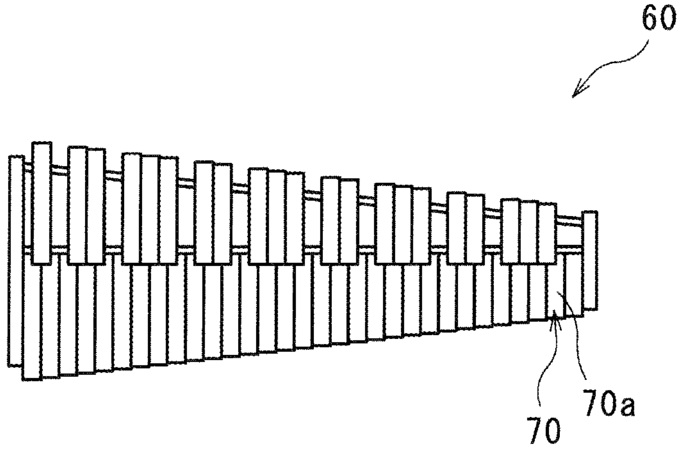
FIG. 12 is a schematic plan view showing a percussion instrument according to an embodiment of the present disclosure.

A percussion instrument 60 of FIG. 12 includes a plurality of sound bars 70. Each of the plurality of sound bars 70 has an elongated striking surface 70*a*. The percussion instrument 60 includes, as the plurality of sound bars 70, for example, any one of the sound bar 10 in FIGS. 1 to 5, the sound bar 20 in FIG. 6, the sound bar 30 in FIG. 7 to FIG. 9, the sound bar 40 in FIG. 10, and the sound bar 50 in FIG. 11. The percussion instrument 60 is, for example, a marimba, a xylophone, and a vibraphone.

In the percussion instrument 60, for example, a material for a surface layer (outermost layer on the striking surface 70*a* side) is the same in all of the sound bars 70. In the percussion instrument 60, the material for the surface layer may be the same by, for example, making the surface layers of all sound bars 70 from wood, or making the surface layers of all sound bars 70 a layer of wood impregnated with a dissimilar material. In the percussion instrument 60, by making the material for the surface layer be the same in all sound bars 70, it is easy to make uniform quality such as appearance in all of the sound bars 70. For example, when wood is used as the material for the surface layer, the types of wood in all the surface layers are made the same from the viewpoint of promoting uniform quality of all of the sound bars 70. In addition, wood grain of the wood for all surface layers and the types of dissimilar materials with which the wood is impregnated may be the same. In addition, the types of coatings and painting materials may be the same.

In the percussion instrument 60, at least two or more sound bars 70 are different, for example, in the number of layers or materials for the corresponding layers. By adjusting the number of layers and the material for each layer for each sound bar 70, it is possible to easily control the sound quality of the striking surface and the striking portion for each sound bar 70 in the percussion instrument 60. As a result, the percussion instrument 60 is likely to emit sounds of desired sound qualities for each sound bar 70.

<Advantages>

The percussion instrument 60 includes the sound bar, so that a range of the performance representation can be expanded.

Other Embodiments

The embodiments do not limit the configuration of the present disclosure. Therefore, in the embodiments, the components of each part of the embodiments can be omitted, replaced, or added based on the description of the present specification and common general technical knowledge, and all of them should be interpreted as belonging to the scope of the present disclosure.

The configurations of the sound bars described in the above embodiments can be combined as appropriate. For example, in a configuration in which the intermediate layer is disposed between the surface layer and the base of the sound bar, one or both of the surface layer and the intermediate layer may be made of a material containing no oriented fiber. Two or more intermediate layers may be disposed between the surface layer and the base of the sound bar. In this case, the sound bar may have a striking portion corresponding to the number of layers of the intermediate layer.

When the surface layer contains oriented fibers, the fibers may not extend along the longitudinal direction of the first surface of the surface layer. The direction of the fibers of the surface layer and the direction of the fibers of the intermediate layer may not be perpendicular to each other in the plan view. For example, the fibers of the surface layer and the fibers of the intermediate layer may be arranged in parallel in the plan view.

When the sound bar includes a surface layer, an intermediate layer, and a base, the cutout surface may not reach the base. In the sound bar, even when the cutout surface does not reach the base, a range of the performance representation can be expanded by striking the surface layer and the intermediate layer separately.

Figure 13:
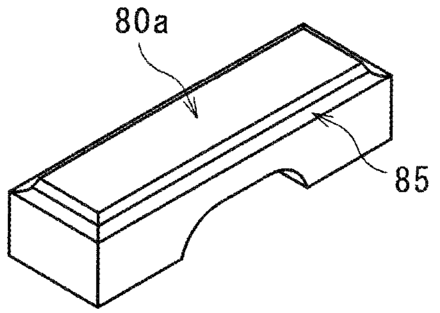
FIG. 13 is a schematic perspective view of a sound bar according to an embodiment different from the sound bar of FIGS. 1, 6, 7, 10, and 11.
Figure 14:
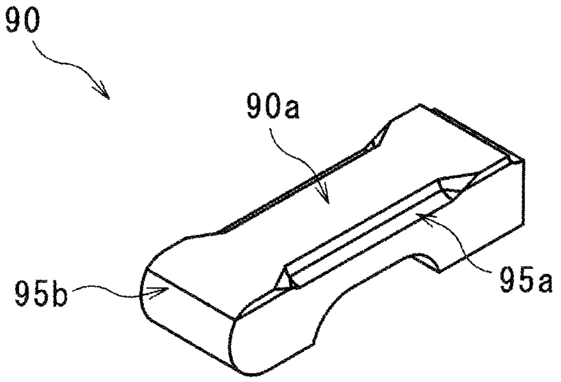
FIG. 14 is a schematic perspective view of a sound bar according to an embodiment different from the sound bar of FIGS. 1, 6, 7, 10, 11, and 13.

The arrangement of the cutout surface is not limited to the peripheral edge portions on both sides in the longitudinal direction of the striking surface. For example, as shown in FIG. 13, the cutout surface 85 may be provided over the entire periphery of the striking surface 80*a*. Further, the cutout surface may be provided only in a peripheral edge portion in a width direction of the striking surface. Further, the cutout surface may be provided only in a peripheral edge portion on one side in the longitudinal direction or the width direction of the striking surface. In addition, as shown in FIG. 14, a shape of the cutout surface may be changed for each arrangement. A sound bar 90 of FIG. 14 has a cutout surface 95*a* formed by cutting out a plurality of flat surfaces in the peripheral edge portion of the striking surface 90*a* in the width direction, and a cutout surface 95*b* formed by cutting out a plurality of curved surfaces in the peripheral edge portion of the striking surface 90*a* in the longitudinal direction. Even with such a configuration, the sound bar 90 can expand a range of the performance representation.

The percussion instrument to which the sound bar is applied is not limited to the percussion instrument described above. The sound bar may be used, for example, for castanets, wood blocks, cajons, temple blocks, chimes, and the like. Further, the shape of the striking surface of the sound bar can be designed based on the percussion instrument to be applied.

As described above, the sound bar according to one embodiment of the present disclosure is suitable for expanding a range of the performance representation.

What is claimed is:

1. A sound bar having a striking surface, the sound bar comprising:

a surface layer having a first surface constituting at least a part of the striking surface and a second surface opposite across a thickness of the surface layer from the first surface; and a base fixed to the second surface of the surface layer, wherein a cutout surface is provided on a peripheral edge portion of the striking surface, and wherein the first surface of the surface layer is smaller than the base in a plan view.

2. The sound bar according to claim 1, wherein the base has a striking portion that is uncovered by the surface layer in the plan view.

3. The sound bar according to claim 1, wherein the base has an upper surface, wherein the surface layer is provided on the base such that the second surface of the surface layer faces the upper surface of the base, and wherein the cutout surface includes a portion of the upper surface of the base, the portion of the upper surface being uncovered by the surface layer.

4. The sound bar according to claim 1, wherein the surface layer has a third surface between the first surface and the second surface, and wherein the cutout surface includes the third surface of the surface layer and an exposed surface of the base, the exposed surface being uncovered by the surface layer in the plan view.

5. The sound bar according to claim 4, wherein the cutout surface has a curved surface, and wherein cross sections of the third surface of the surface layer and the exposed surface of the base, taken perpendicular to the first surface of the surface layer, are arcuate.

6. The sound bar according to claim 4, wherein cross sections of the third surface of the surface layer and the exposed surface of the base, taken perpendicular to the first surface of the surface layer, are polygonal.

7. The sound bar according to claim 2, wherein the cutout surface includes the striking portion.

8. The sound bar according to claim 1, wherein the base is made of wood.

9. The sound bar according to claim 1, further comprising:

an intermediate layer provided between the surface layer and the base such that the base is fixed to the intermediate layer, and the intermediate layer is fixed to the second surface of the surface layer.

10. The sound bar according to claim 9, wherein each of the surface layer and the intermediate layer contains oriented fibers, and wherein a fiber direction of the oriented fibers of the intermediate layer is perpendicular to a fiber direction of the oriented fibers of the surface layer in the plan view.

11. The sound bar according to claim 1, wherein the base includes a fourth surface and a fifth surface opposite across a thickness of the base from the fourth surface, wherein the fifth surface of the base faces the surface layer, and wherein the first surface of the surface layer is smaller than the fifth surface of the base in the plan view.

12. The sound bar according to claim 1, wherein the base comprises a plurality of laminated plates, and a lamination direction of the plurality of laminated plates is perpendicular to a thickness direction of the base.

13. The sound bar according to claim 1, wherein the base contains oriented fibers, and a direction of the oriented fibers is substantially parallel to a normal direction of the striking surface.

14. The sound bar according to claim 1, wherein a specific gravity of the surface layer is different from a specific gravity of the base.

15. A percussion instrument comprising:

a plurality of sound bars, each of the plurality of sound bars comprising:

a surface layer having a first surface constituting at least a part of a striking surface and a second surface opposite across a thickness of the surface layer from the first surface; and a base fixed to the second surface of the surface layer, wherein a cutout surface is provided on a peripheral edge portion of the striking surface, and wherein the first surface of the surface layer is smaller than the base in a plan view, wherein the striking surface of each of the plurality of sound bars is elongated, and wherein the surface layers of all of the plurality of sound bars are made of the same material as each other.

16. A percussion instrument comprising:

a plurality of sound bars, each of the plurality of sound bars comprising:

a surface layer having a first surface constituting at least a part of a striking surface and a second surface opposite across a thickness of the surface layer from the first surface; and a base fixed to the second surface of the surface layer, wherein a cutout surface is provided on a peripheral edge portion of the striking surface, and wherein the first surface of the surface layer is smaller than the base in a plan view, wherein at least two or more sound bars of the plurality of sound bars differ in a number of layers or materials for corresponding layers from each other.

* * * * *